United States Patent
Watanabe et al.

(10) Patent No.: US 12,140,455 B2
(45) Date of Patent: Nov. 12, 2024

(54) ROTATIONAL ANGLE DETECTION APPARATUS

(71) Applicant: Mitsubishi Electric Corporation, Tokyo (JP)

(72) Inventors: Masutaka Watanabe, Tokyo (JP); Kensuke Hayashi, Tokyo (JP); Masanori Tsuchihashi, Tokyo (JP); Eiji Kanazawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 163 days.

(21) Appl. No.: 18/059,351

(22) Filed: Nov. 28, 2022

(65) Prior Publication Data

US 2023/0213356 A1 Jul. 6, 2023

(30) Foreign Application Priority Data

Jan. 6, 2022 (JP) ................................. 2022-000834

(51) Int. Cl.
*G01D 5/14* (2006.01)
*G01B 7/30* (2006.01)
(Continued)

(52) U.S. Cl.
CPC .............. *G01D 5/145* (2013.01); *G01B 7/30* (2013.01); *H02P 6/06* (2013.01); *H02P 6/12* (2013.01)

(58) Field of Classification Search
CPC .......... G01D 5/145; G01D 5/147; G01D 3/08; G01D 5/24461; G01B 7/30; G01B 21/22;
(Continued)

(56) References Cited

U.S. PATENT DOCUMENTS

| 2002/0175645 A1* | 11/2002 | Fujimoto | H02P 6/16 318/400.04 |
| 2010/0271042 A1* | 10/2010 | Uemura | G01C 25/00 324/537 |

(Continued)

FOREIGN PATENT DOCUMENTS

| JP | 61-76910 A | 4/1986 |
| JP | 10-48251 A | 2/1998 |

(Continued)

OTHER PUBLICATIONS

Notification of Reasons for Refusal dated Jan. 24, 2023 from the Japanese Patent Office in Japanese Application No. 2022-000834.

*Primary Examiner* — Giovanni Astacio-Oquendo
*Assistant Examiner* — Zannatul Ferdous
(74) *Attorney, Agent, or Firm* — Sughrue Mion, PLLC; Richard C. Turner

(57) ABSTRACT

To provide a rotational angle detection apparatus which can determine abnormality of the rotational angle detection apparatus only by detection information of the rotational angle detection apparatus even when the rotational speed is low. A rotational angle detection apparatus totals sensor output values of N−1 pieces of the rotation detection sensors other than the diagnosis object sensor; calculates a value obtained by inverting positive/negative of a total value, as an estimation value of sensor output value of the diagnosis object sensor; calculates an estimation difference which is a difference between a sensor output value of the diagnosis object sensor, and the estimation value of sensor output value of the diagnosis object sensor; and determines that abnormality occurred in the diagnosis object sensor, when the estimation difference is out of a determination range for estimation difference.

14 Claims, 12 Drawing Sheets

(51) Int. Cl.
*H02P 6/06* (2006.01)
*H02P 6/12* (2006.01)

(58) Field of Classification Search
CPC ..... H02P 6/06; H02P 6/12; H02P 6/16; B62D 5/049; B62D 15/0235
See application file for complete search history.

(56) References Cited

U.S. PATENT DOCUMENTS

2012/0182009 A1    7/2012  Ueda
2015/0077093 A1*   3/2015  Saito .................. G01D 5/24466
                                                           324/207.13

FOREIGN PATENT DOCUMENTS

JP    2005-335591 A    12/2005
JP    2012-149909 A     8/2012

* cited by examiner

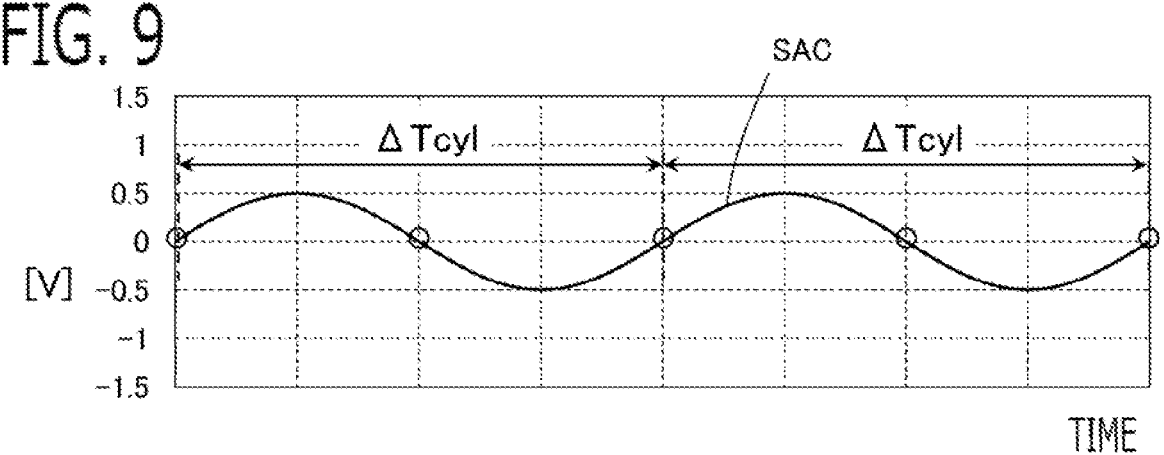
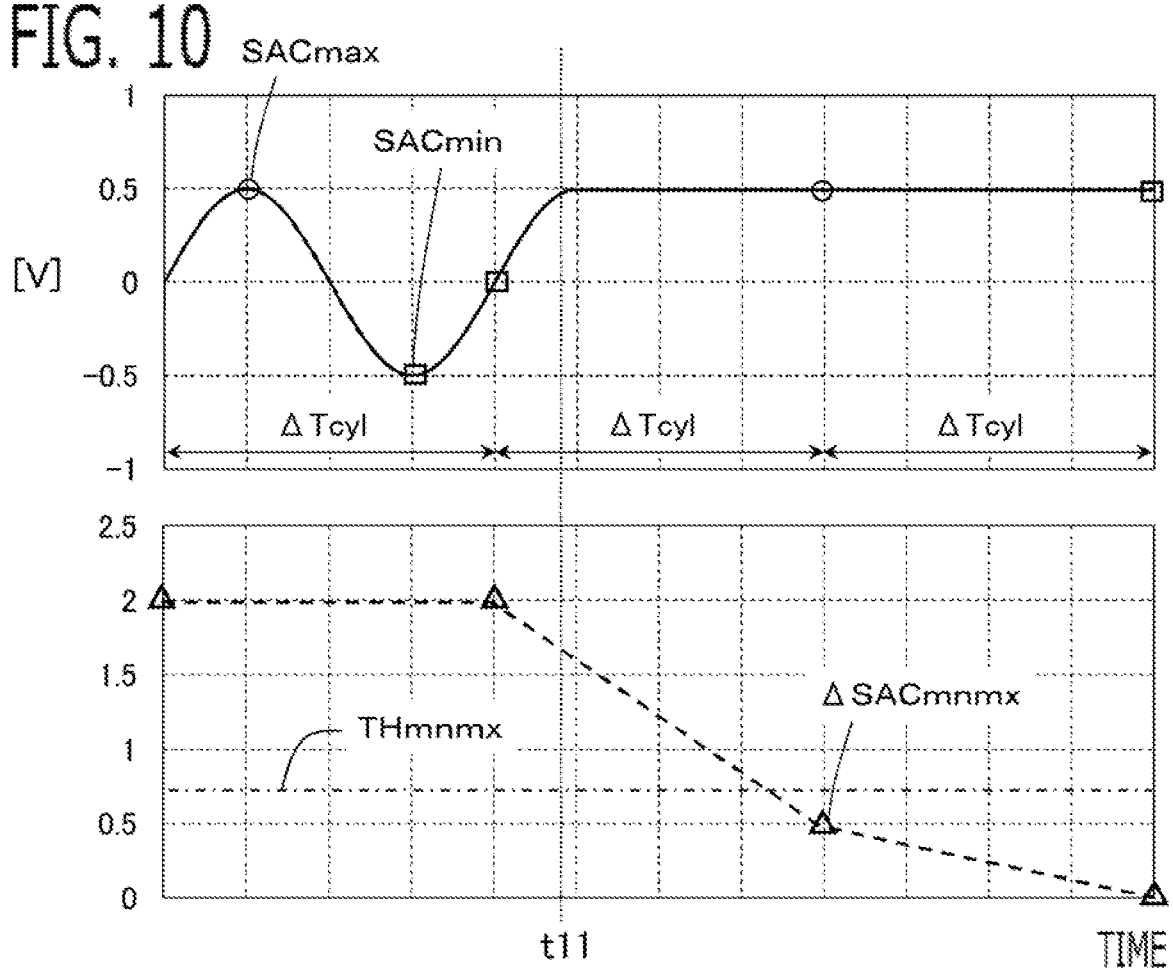

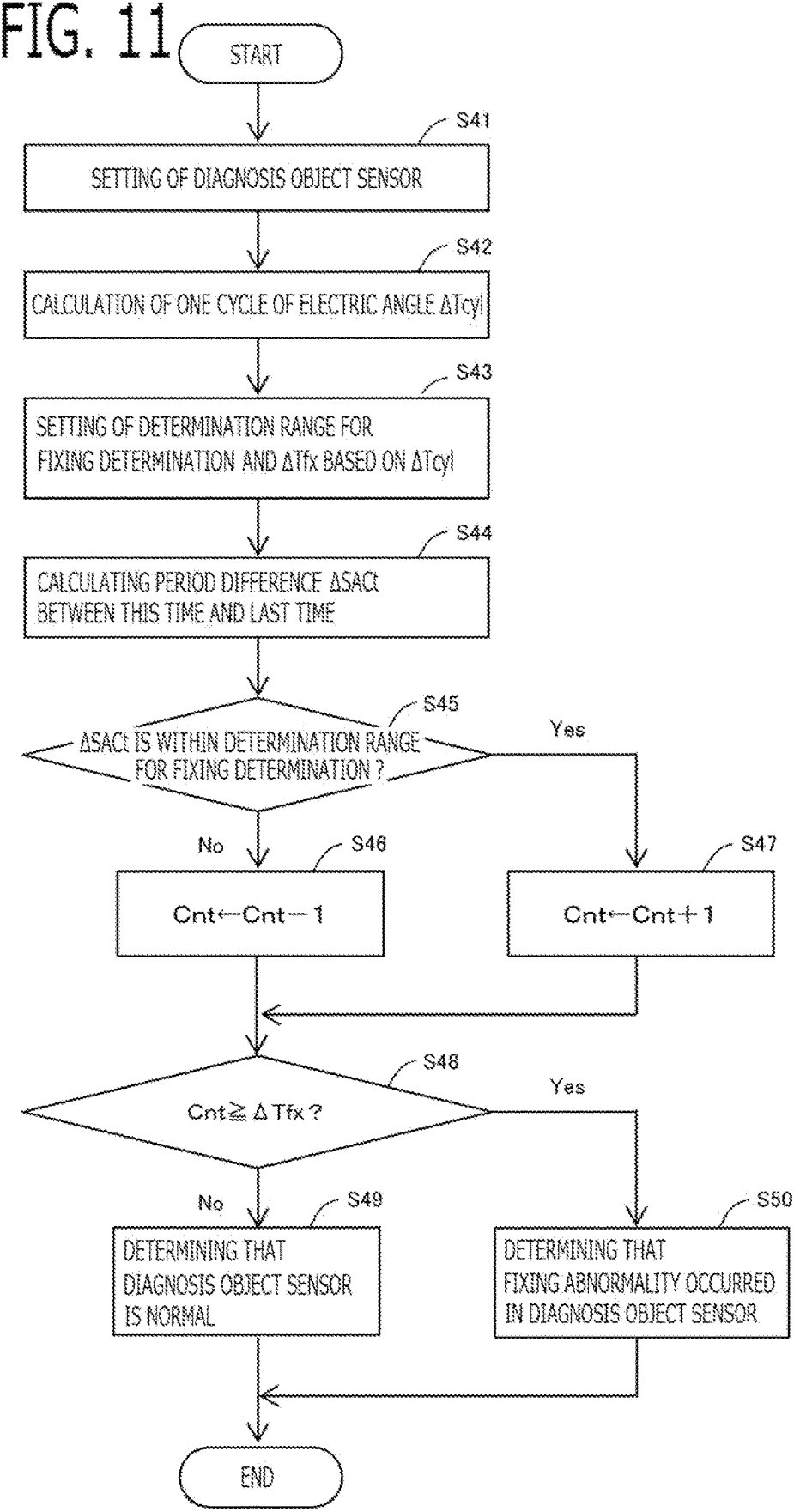

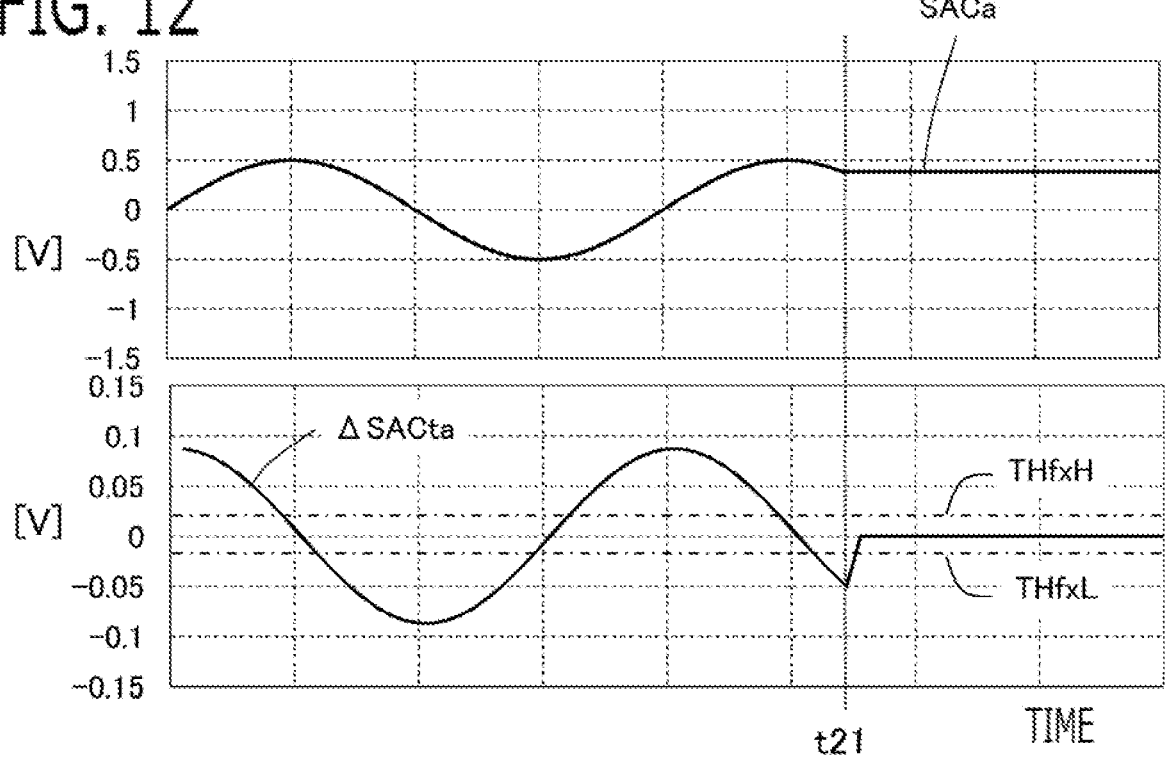

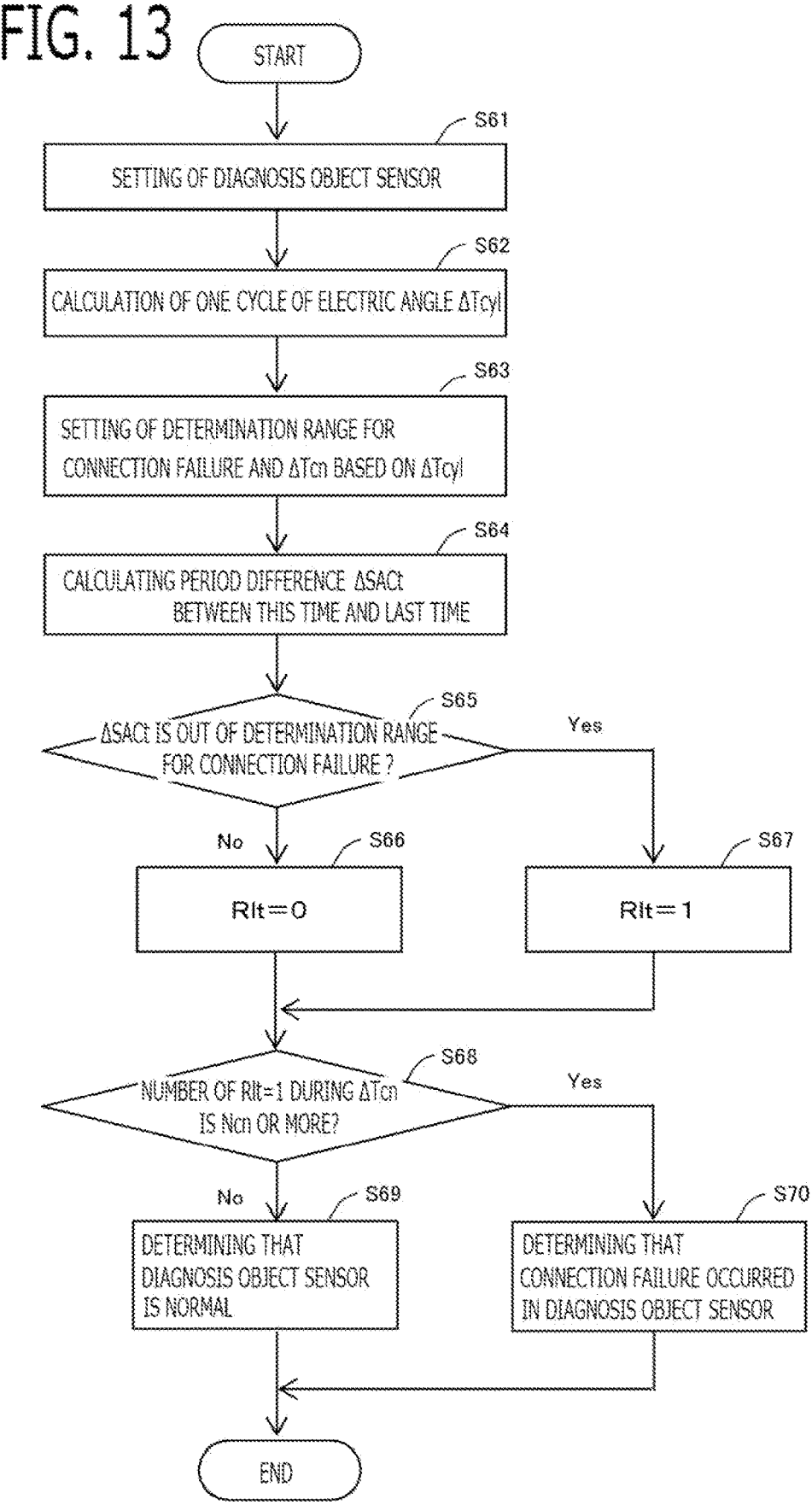

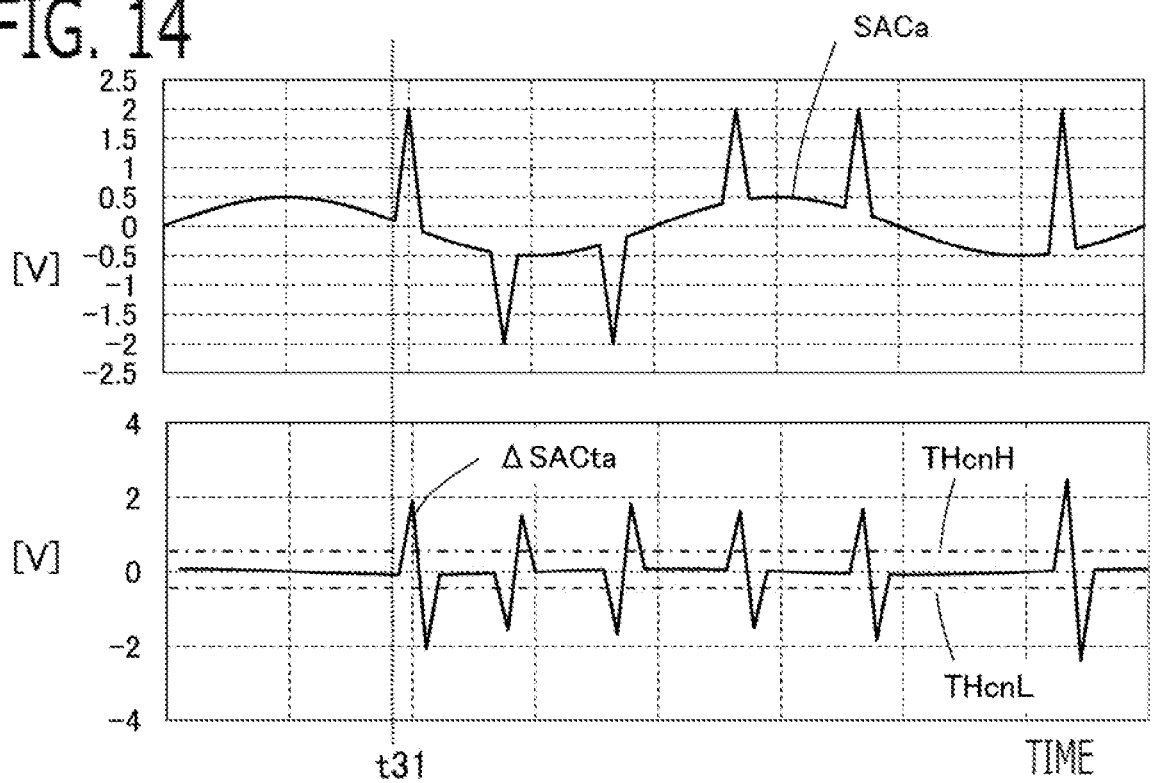

ROTATIONAL ANGLE DETECTION APPARATUS

INCORPORATION BY REFERENCE

The disclosure of Japanese Patent Application No. 2022-000834 filed on Jan. 6, 2022 including its specification, claims and drawings, is incorporated herein by reference in its entirety.

BACKGROUND

The present disclosure relates to a rotational angle detection apparatus.

Recently, for environmental load reduction of vehicle, the motorizing of vehicle which uses the electric motor for vehicle driving is proceeded. In this kind of the electric vehicle, it is necessary to detect the rotational angle of the electric motor correctly and to secure the driving performance of the vehicle. Then, when abnormality is observed in the rotational angle detection apparatus, it is required to detect failure immediately and transfer to a safety state.

As the fault diagnosis method of the rotational angle detection apparatus, for example, there is JP 2005-335591 A. JP 2005-335591 A discloses the technology that the abnormality detection is performed by comparing the motor angle calculated from the output pattern of Hall sensor outputted according to the rotational position of the motor rotor, with the estimation motor angle calculated based on the counter electromotive voltage of the motor.

SUMMARY

However, in the abnormality detection of the rotation angle detection apparatus of JP 2005-335591 A, abnormality cannot be detected until a timing when the output signal of Hall sensor changes, and a time until abnormality is detected becomes quite long, when the rotational speed of the motor is low. When the rotational speed of the motor is low, since the induced voltage is low, and the estimation motor angle cannot be calculated with good accuracy by the induced voltage, the abnormality detecting precision becomes low. Since the estimation motor angle by the counter electromotive voltage is required, abnormality cannot be detected only by detection information of the rotational angle detection apparatus.

Then, the purpose of the present disclosure is to provide a rotational angle detection apparatus which can determine abnormality of the rotational angle detection apparatus only by detection information of the rotational angle detection apparatus even when the rotational speed is low.

The first rotational angle detection apparatus according to the present disclosure, including:

N pieces of rotation detection sensors (N is an integer greater than or equal to 3) that each sensor output value changes in a sine wave shape according to a rotational angle of a rotation member, and a total value of all the sensor output values becomes 0; and an abnormality diagnosis unit that sets a diagnosis object sensor which is the one rotation detection sensor for performing abnormality diagnosis; totals sensor output values of N−1 pieces of the rotation detection sensors other than the diagnosis object sensor; calculates a value obtained by inverting positive/negative of a total value, as an estimation value of sensor output value of the diagnosis object sensor; calculates an estimation difference which is a difference between a sensor output value of the diagnosis object sensor, and the estimation value of sensor output value of the diagnosis object sensor; and determines that abnormality occurred in the diagnosis object sensor, when the estimation difference is out of a determination range for estimation difference.

The second rotational angle detection apparatus according to the present disclosure, including:

N pieces of rotation detection sensors (N is an integer greater than or equal to 3) that each sensor output value changes in a sine wave shape according to a rotational angle of a rotation member, and a total value of all the sensor output values becomes 0; and an abnormality diagnosis unit that sets a diagnosis object sensor which is the one rotation detection sensor for performing abnormality diagnosis; calculates a maximum minimum difference which is a difference between a maximum value and a minimum value of the sensor output value of the diagnosis object sensor in one cycle of electric angle which is one cycle of the sine wave-shaped sensor output value; and determines that a fixing abnormality that the output signal of the diagnosis object sensor fixes to a constant value occurred, when a condition where a magnitude of the maximum minimum difference is less than or equal to a determination value for maximum minimum difference continues during a fixing determination period.

The third rotational angle detection apparatus according to the present disclosure, including:

N pieces of rotation detection sensors (N is an integer greater than or equal to 3) that each sensor output value changes in a sine wave shape according to a rotational angle of a rotation member, and a total value of all the sensor output values becomes 0; and an abnormality diagnosis unit that sets a diagnosis object sensor which is the one rotation detection sensor for performing abnormality diagnosis; calculates a period difference which is a difference between the sensor output value of the diagnosis object sensor before a difference period and the sensor output value of the diagnosis object sensor of this time; and determines that a fixing abnormality that the output signal of the diagnosis object sensor fixes to a constant value occurred, when a condition where the period difference is within a determination range for fixing determination including 0 continues during a fixing determination period.

The fourth rotational angle detection apparatus according to the present disclosure, including:

N pieces of rotation detection sensors (N is an integer greater than or equal to 3) that each sensor output value changes in a sine wave shape according to a rotational angle of a rotation member, and a total value of all the sensor output values becomes 0; and an abnormality diagnosis unit that sets a diagnosis object sensor which is the one rotation detection sensor for performing abnormality diagnosis; calculates a period difference which is a difference between the sensor output value of the diagnosis object sensor before a difference period and the sensor output value of the diagnosis object sensor of this time; and determines that a connection failure of a signal wire which transmits an output signal of the diagnosis object sensor occurred, when a number of times when the period difference became out of a determination range for connection failure including 0 during a connection failure determination period becomes greater than or equal to a connection failure determination number.

According to the first rotational angle detection apparatus of the present disclosure, by utilizing that the total value of the sensor output values of all the sensors becomes 0 at the normal time irrespective of high and low of the rotational speed, the estimation value of sensor output value of the diagnosis object sensor is calculated based on the sensor output values of N−1 pieces of non-diagnosis object sensors. By determining whether or not the estimation difference which is a difference between the sensor output value of the diagnosis object sensor and the estimation value of the diagnosis object sensor is out of the determination range for estimation error, occurrence of abnormality of the diagnosis object sensor can be determined with good accuracy. Accordingly, even when the rotational speed is low, the abnormality of rotational angle detection apparatus can be determined only by detection information of the rotational angle detection apparatus.

According to the second rotational angle detection apparatus of the present disclosure, when the fixing abnormality of the diagnosis object sensor occurs, since the maximum minimum difference which is a difference between a maximum value and a minimum value of the sensor output value of the diagnosis object sensor in one cycle of electric angle approaches 0, occurrence of fixing abnormality can be determined with good accuracy. Accordingly, even when the rotational speed is low, the abnormality of rotational angle detection apparatus can be determined only by detection information of the rotational angle detection apparatus.

According to the third rotational angle detection apparatus of the present disclosure, when the fixing abnormality of the diagnosis object sensor occurs, since the period difference which is a difference between the sensor output value of the diagnosis object sensor before the difference period and the sensor output value of the diagnosis object sensor of this time approaches 0, occurrence of fixing abnormality can be determined with good accuracy. Even at the normal time, when the sensor output value approaches the maximum value or the minimum value, the period difference approaches 0. Since continuation of the fixing determination period is determined, it is not erroneously determined that the fixing abnormality occurred. Accordingly, even when the rotational speed is low, the abnormality of rotational angle detection apparatus can be determined only by detection information of the rotational angle detection apparatus.

According to the fourth rotational angle rotational angle detection apparatus of the present disclosure, when the connection failure of the signal wire occurred, the output signal varies, and before and after the connection failure occurred, the period difference which is a difference between the sensor output value of the diagnosis object sensor before the difference period and the sensor output value of the diagnosis object sensor of this time varies largely from the normal vibration range centering on 0. Accordingly, when a number when the period difference became out of the determination range for connection failure in the connection failure determination period becomes the connection failure determination number or more, it can be determined that the connection failure of the signal wire occurred. Accordingly, even when the rotational speed is low, the abnormality of rotational angle detection apparatus can be determined only by detection information of the rotational angle detection apparatus.

BRIEF DESCRIPTION OF THE DRAWINGS

FIG. 9 is a time chart explaining detection of the one cycle of electric angle according to Embodiment 2;

FIG. 10 is a time chart explaining the abnormality diagnosis behavior when the fixing abnormality occurred according to Embodiment 2;

FIG. 11 is a flowchart explaining processing of the abnormality diagnosis unit according to Embodiment 3;

FIG. 12 is a time chart explaining an abnormality diagnosis behavior when the fixing abnormality occurred according to Embodiment 3;

FIG. 13 is a flowchart explaining processing of the abnormality diagnosis unit according to Embodiment 4; and FIG. 14 is a time chart explaining the abnormality diagnosis behavior when the connection failure occurred according to Embodiment 4.

DETAILED DESCRIPTION OF THE EMBODIMENTS

1. Embodiment 1

Figure 1:
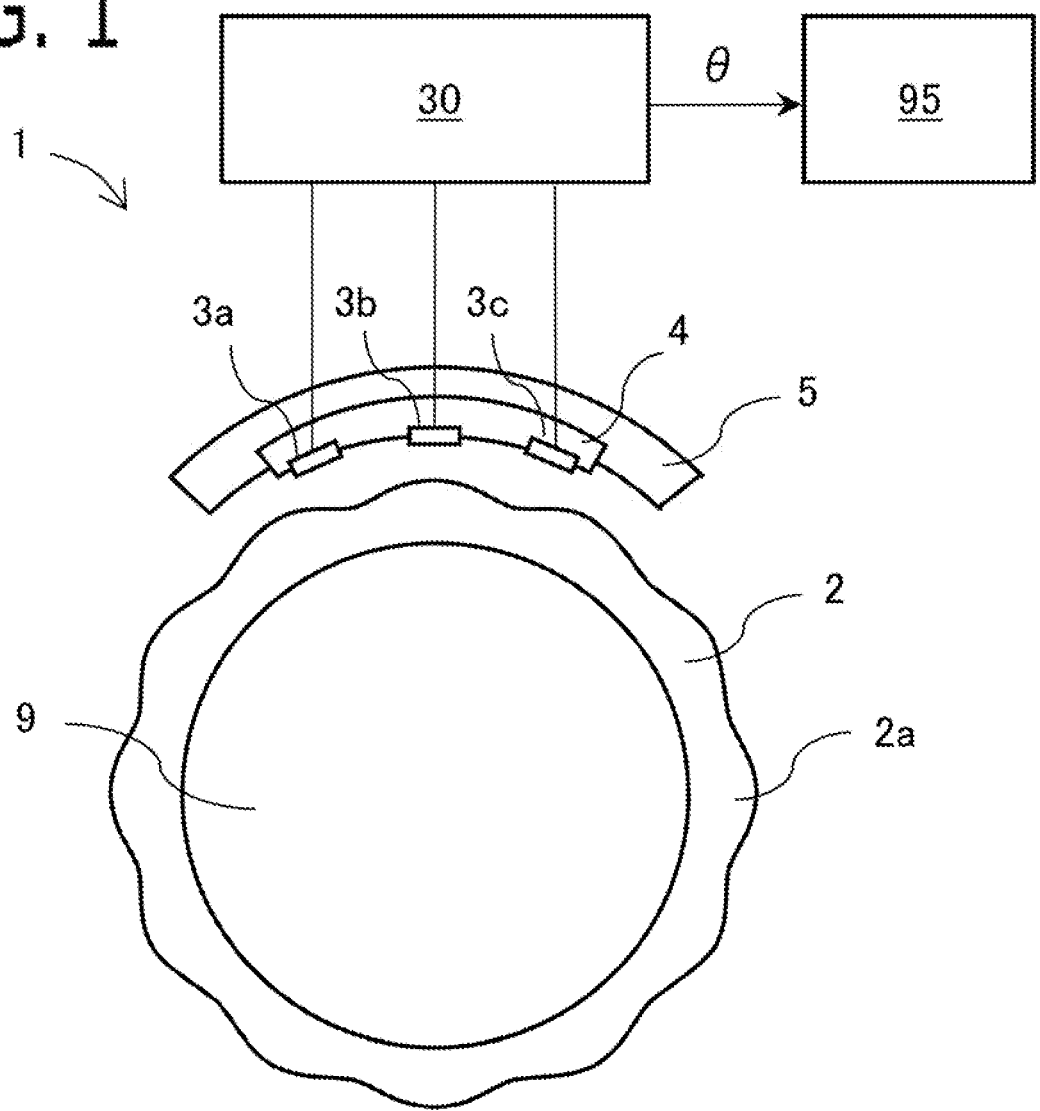
FIG. 1 is a schematic configuration diagram of the rotational angle rotational angle detection apparatus according to Embodiment 1.

A rotational angle detection apparatus 1 according to Embodiment 1 will be explained with reference to drawings. FIG. 1 is a schematic configuration diagram of the rotational angle detection apparatus 1 according to the present embodiment.

The rotational angle detection apparatus 1 is provided with N pieces of rotation detection sensors 3 (N is an integer greater than or equal to 3), and a controllers 30. In the present embodiment, the rotational angle detection apparatus 1 is provided with a rotor 2 and a magnetic field generating magnet 4.

1-1. Rotor 2

The rotor 2 is fixed to a rotation member 9, such as a rotation axis of a motor, and rotates integrally with the rotation member 9. M pieces of projection parts 2a (M is an integer greater than or equal to one) are formed in the rotor 2 at equivalent intervals in the circumferential direction. The rotor 2 is constituted by a magnetic body. In the present embodiment, M is set to 12. Every time the rotor 2 rotates 1 time in a mechanical angle, an angle θ detected by the rotational angle detection apparatus 1 rotates 12 times in an electrical angle.

The projection height of the projection parts 2a changes in a curved shape in the circumferential direction (in this example, sine wave shape) so that the output signal of the rotation detection sensor 3 changes in a sine wave shape according to the rotational angle of the rotor 2. In the present embodiment, the projection parts 2a are formed in the peripheral part of the cylindrical tubular rotor 2, and the projection height in the radial-direction outside changes in the curved shape in the circumferential direction.

1-2. Magnetic Field Generating Magnet 4

The magnetic field generating magnet 4 is arranged opposing to the projection parts 2a, and a magnetic field is generated between the magnetic field generating magnet 4 and the projection parts 2a. The magnetic field generating magnet 4 is arranged on the radial-direction outside of the projection part 2a. A gap length between the projection parts 2a and the magnetic field generating magnet 4 changes according to the rotational angle of the rotor 2, and a flux density changes according to the gap length. The magnetic field generating magnet 4 is formed in a circular arc shape with a constant radius which extends in an interval in the circumferential direction longer than an interval in the circumferential direction where the N pieces of rotation detection sensors 3 are arranged. The arrangement interval in the circumferential direction of the magnetic field generating magnet 4 is set longer than the arrangement interval in the circumferential direction of the N pieces of rotation detection sensors 3, so that the magnetic field generating magnet 4 is arranged on the radial-direction outside of the N pieces of rotation detection sensors 3. The magnetic field generating magnet 4 may be divided in the circumferential direction in accordance with arrangement in the circumferential direction of the N pieces of rotation detection sensors 3. Magnetic poles are different between the radial-direction inner side and the radial-direction outside of the magnetic field generating magnet 4, and it generates the magnetic flux in the radial direction. A magnetic magnetic-flux collecting core 5 is provided on the radial-direction outside and the circumferential direction both sides of the magnetic field generating magnet 4, and it has the effect of increasing the flux density of gap. The magnetic-flux collecting core 5 may not be provided.

1-3. Rotation Detection Sensor

Each output signal of N pieces of rotation detection sensors 3 changes in a sine wave shape according to the rotational angle of the rotor, and a total value of all the sensor output signals becomes 0.

In the present embodiment, N is set to 3, and the first rotation detection sensor 3a, the second rotation detection sensor 3b, and the third rotation detection sensor 3c are provided. The three pieces of rotation detection sensors 3 are arranged in the circumferential direction so that phases of respective output signals of sine wave shape are different with each other by 360/N degrees (in this example, 120 degrees) in the electrical angle. 360/N degrees (in this example, 120 degrees) in the electrical angle corresponds to 360/N/M degrees in the mechanical angle (in this example, 10 degrees). In this example, the three pieces of rotation detection sensors 3 are arranged in the circumferential direction at intervals of 10 degrees in the mechanical angle. The three pieces of rotation detection sensors 3 should be arranged in the circumferential direction so that phases are different with each other by 120 degrees in the electrical angle, and the three pieces of rotation detection sensors 3 may be arranged in the circumferential direction at intervals of 120 degrees+360 degrees× A (A is an integer greater than or equal to one) in the electrical angle.

Each rotation detection sensor 3 is arranged on the radial-direction inner side of the magnetic field generating magnet 4, and detects the flux density generated between the projection parts 2a and the magnetic field generating magnet 4. The flux density changes according to the distance between the projection parts 2a and the magnetic field generating magnet 4, and changes in the sine wave shape according to the rotational angle. Each rotation detection sensor 3 is a magnetic sensor which detects flux density, and is a Hall element or the like. The output signal of each rotation detection sensor 3 is inputted into the controller 30.

1-4. Controller 30

Figure 2:
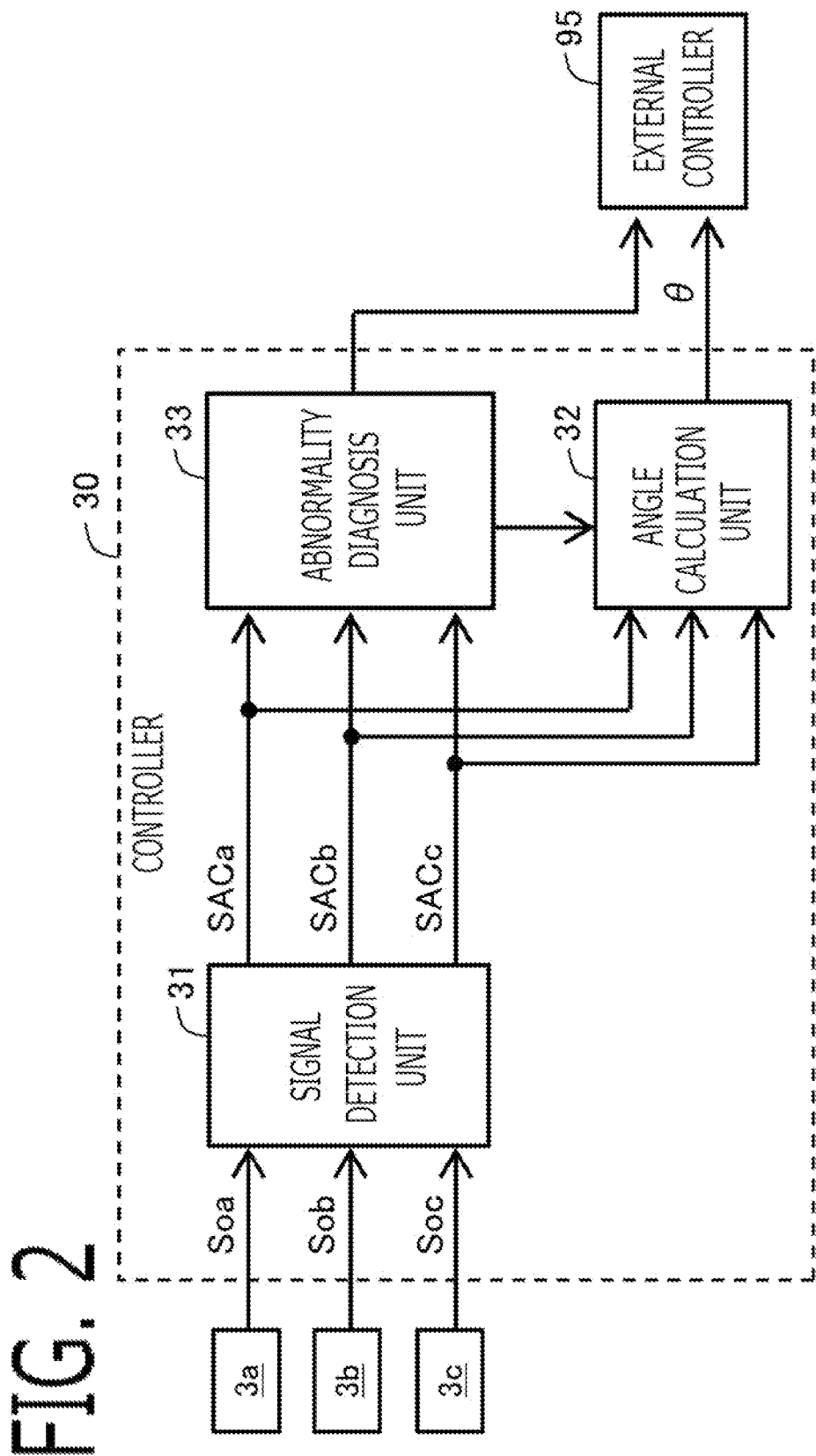
FIG. 2 is a schematic block diagram of the controller according to Embodiment 1.

The rotational angle detection apparatus 1 is provided with a controller 30. As shown in FIG. 2, the controller 30 is provided with a signal detection unit 31, an angle calculation unit 32, and an abnormality diagnosis unit 33.

Figure 3:
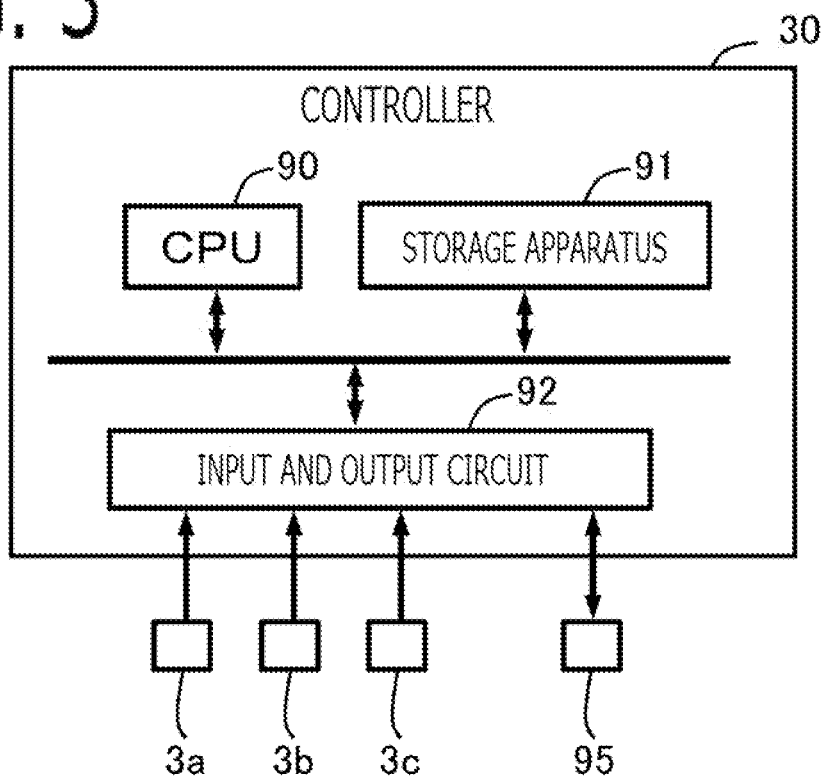
FIG. 3 is a schematic hardware configuration diagram of the controller according to Embodiment 1.

As shown in FIG. 3, specifically, the controller 30 is provided with an arithmetic processor 90 such as CPU (Central Processing Unit), storage apparatuses 91, an input and output circuit 92 which outputs and inputs external signals to the arithmetic 90, and the like.

As the arithmetic processor 90, ASIC (Application Specific Integrated Circuit), IC (Integrated Circuit), FPGA (Field Programmable Gate Array, various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided.

The input and output circuit 92 is provided with a communication device, an A/D converter, an input/output port, a driving circuit, and the like. The input and output circuit 92 (A/D converter) is connected to each rotation detection sensor 3, the output signal of each rotation detection sensor 3 is A/D converted, and it transmits to the arithmetic processor 90. The input and output circuit 92 (communication device) is connected to an external controller 95, and the rotational angle θ and the abnormality diagnosis information of the rotation detection sensor 3 calculated by the arithmetic processor 90 are transmitted to the external controller 95. The external controller 95 is a controller of a rotation apparatus, such as a motor, which rotates integrally with the rotation member 9.

Then, the arithmetic processor 90 runs software items (programs) stored in the storage apparatus 91 such as a ROM and collaborates with other hardware devices in the controller 30, such as the storage apparatus 91, and the input and output circuit 92, so that the respective functions of the processing units 31 to 33 provided in the controller 30 are realized. Setting data items such as a determination range, and a determination value to be utilized in the processing units 31 to 33 are stored, as part of software items (programs), in the storage apparatus 91 such as a ROM. Each function of the controller 30 will be described in detail below.

<Signal Detection Unit 31>

The signal detection unit 31 detects a sine wave-shaped sensor output component of each output signal of the three pieces of rotation detection sensors 3a, 3b, 3c, as the sensor output values SACa, SACb, SACc. The signal detection unit 31 detects at every detection period.

Figure 4:
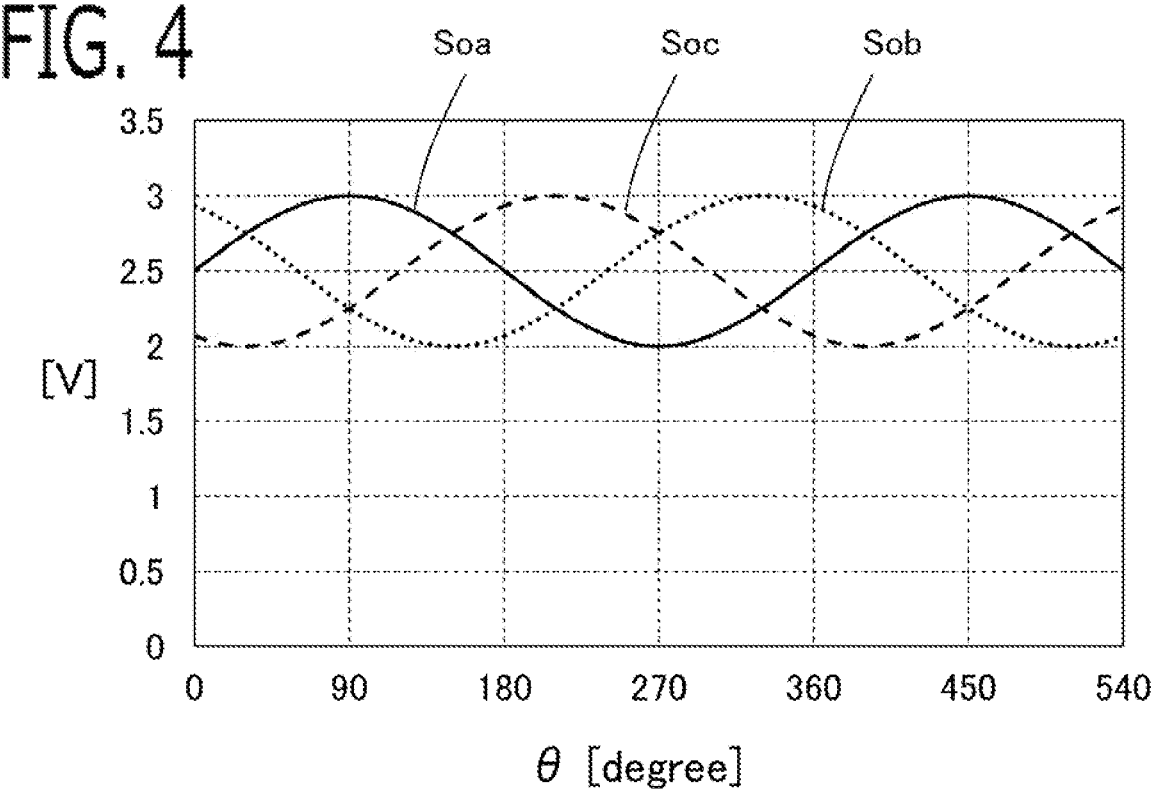
FIG. 4 is a figure explaining the output signal of each rotation detection sensor according to Embodiment 1.

As shown in FIG. 4 and the next equation, besides the sine wave-shaped vibration component which changes according to the rotational angle θ in the electrical angle of the rotation member, the DC offset component Off is superimposed on the output signal Soa, Sob, Soc of each rotation detection sensor 3a, 3b, 3c.

[Equation 1]

$$Soa = Ko \times \sin(\theta) + \text{Off}$$

$$Sob = Ko \times \sin\left(\theta + \frac{2}{3}\pi\right) + \text{Off}$$

$$Soc = Ko \times \sin\left(\theta + \frac{4}{3}\pi\right) + \text{Off} \quad (1)$$

Herein, Ko is a gain of the sensor output and becomes the same value among sensors in an ideal state without variation. The offset component Off becomes the same value among sensors in the ideal state without variation.

As shown in the next equation, the signal detection unit 31 calculates the sensor output value SACa, SACb, SACc of each sensor which becomes a sine wave-shaped sensor output component, by subtracting the offset component value Off from the output signal Soa, Sob, Soc of each rotation detection sensor 3a, 3b, 3c.

[Equation 2]

$$SACa = Soa - \text{Off}$$

$$SACb = Sob - \text{Off}$$

$$SACc = Soc - \text{Off} \quad (2)$$

The offset component value Off may be set to a preliminarily set value. Or, in order to deal with variation factor, the offset component value Off of each sensor may be set to a value obtained by performing a statistical processing, such as an averaging processing, to the detection value Soa, Sob, Soc of the output signal of each rotation detection sensor at the normal time. The offset component values Off of each sensor may be different.

<Abnormality Diagnosis Unit 33>

As shown in the next equation, at the normal time, the total value of the sensor output values SACa, SACb, SACc of all the sensors becomes 0.

[Equation 3]

$$SACa + SACb + SACc \cong \quad (3)$$
$$Ko \times \sin(\theta) + Ko \times \sin\left(\theta + \frac{2}{3}\pi\right) + Ko \times \sin\left(\theta + \frac{4}{3}\pi\right) = 0$$

As shown in the next equation according to the equation (3), at the normal time, the sensor output value of one sensor should become equal to a value obtained by inverting positive/negative of a total value of the sensor output values of the two remaining sensors.

[Equation 4]

$$SACa \cong -(SACb + SACc)$$

$$SACb \cong -(SACa + SAC)$$

$$SACc \cong -(SACa + SACb) \quad (4)$$

Then, the abnormality diagnosis unit 33 sets a diagnosis object sensor which is the one rotation detection sensor for performing abnormality diagnosis; totals sensor output values of N−1 pieces of the rotation detection sensors other than the diagnosis object sensor (hereinafter, referred to as non-diagnosis object sensor); and calculates a value obtained by inverting positive/negative of the total value, as an estimation value SACest of sensor output value of the diagnosis object sensor. Then, the abnormality diagnosis unit 33 calculates an estimation difference ΔSACest which is a difference between a sensor output value SAC of the diagnosis object sensor, and the estimation value SACest of sensor output value of the diagnosis object sensor; and determines that abnormality occurred in the diagnosis object sensor, when the estimation difference ΔSACest is out of a determination range for estimation difference.

The abnormality diagnosis unit 33 sets each rotation detection sensor 3a, 3b, 3c as the diagnosis object sensor in order, and determines abnormality of each rotation detection sensor. For example, when the diagnosis object sensor is set to the first rotation detection sensor 3a, the abnormality diagnosis unit 33 totals the sensor output values SACb, SACc of the second rotation detection sensor 3b and the third rotation detection sensor 3c, as shown in the next equation; and calculates a value obtained by inverting positive/negative of the total value, as the estimation value SACesta of sensor output value of the first rotation detection sensor 3a. Then, the abnormality diagnosis unit 33 calculates the estimation difference ΔSACesta which is a difference between the sensor output value SACa of the first rotation detection sensor 3a and the estimation value SACesta of sensor output value of the first rotation detection sensor 3a; and determines that abnormality occurred in the first rotation detection sensor 3a, when the estimation difference ΔSACesta is out of the determination range for estimation error (from THestL to THestH).

[Equation 5]

$$SACesta = -(SACb + SACc)$$

$$\Delta SACesta = SACesta - SACa$$

$$THestL \leq \Delta SACesta \leq THestH \quad (5)$$

For example, the determination range for estimation error (from THestL to THestH) is set to a range of about several percent of the vibration range of the sensor output value of the rotation detection sensor at the normal time.

According to this configuration, by utilizing that the total value of the sensor output values SACa, SACb, SACc of all the sensors becomes 0 at the normal time, the estimation value of sensor output value of the diagnosis object sensor is calculated based on the sensor output values of N−1 pieces of non-diagnosis object sensors. By determining whether or not the estimation difference ΔSACest which is a difference between the sensor output value of the diagnosis object sensor and the estimation value of the diagnosis object sensor is out of the determination range for estimation error, occurrence of abnormality of the diagnosis object sensor can be determined with good accuracy.

The abnormality diagnosis unit 33 transmits the determination information of abnormality occurrence to the angle calculation unit 32, the external controller 95, and the like.

<Flowchart>

Figure 5:
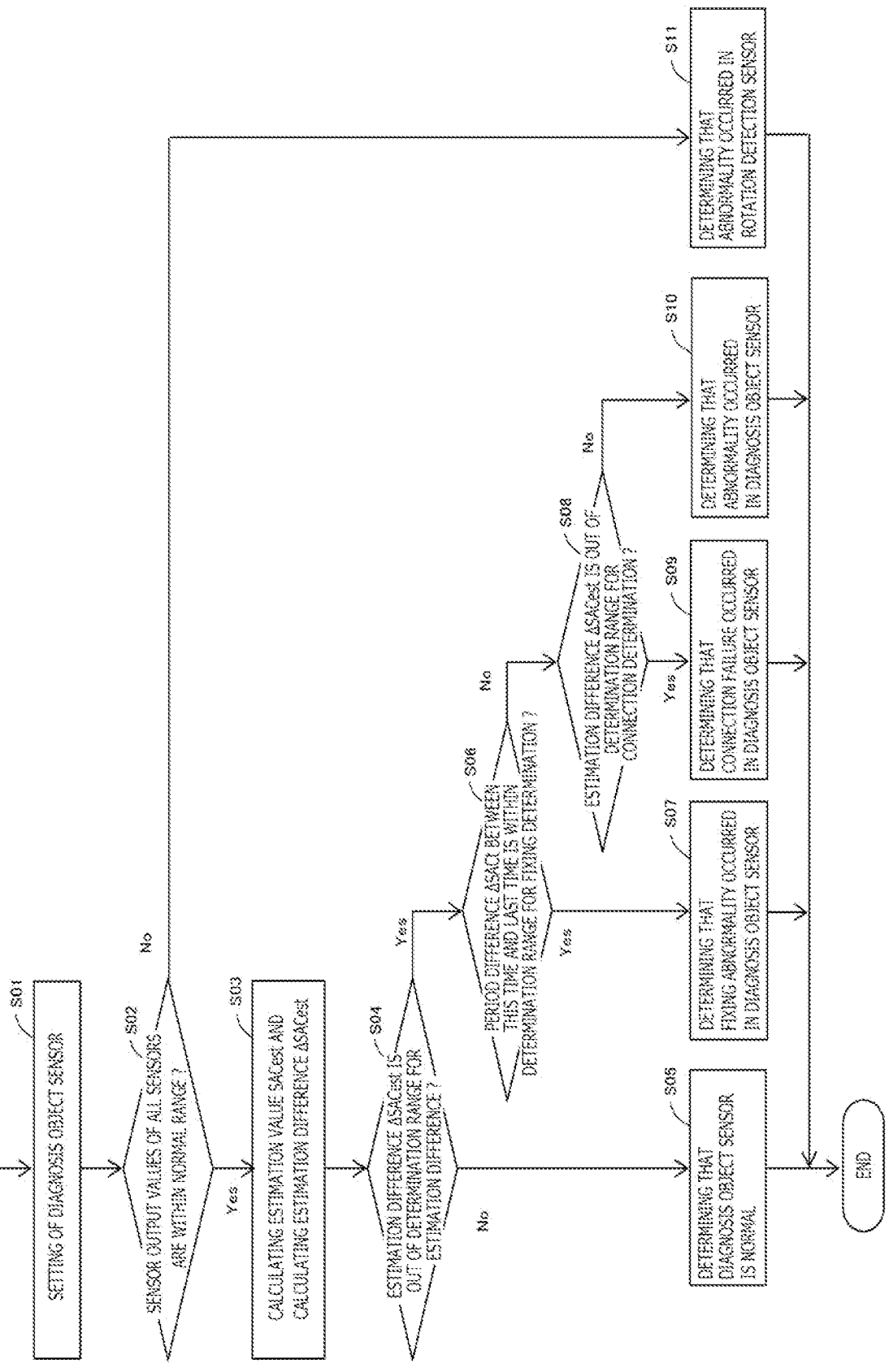
FIG. 5 is a flowchart explaining processing of the abnormality diagnosis unit according to Embodiment 1.

Processing of the abnormality diagnosis unit 33 according to the present embodiment is configured like the flowchart shown in FIG. 5. Processing of the flowchart of FIG. 5 is executed at every calculation period.

In the step S01, the abnormality diagnosis unit 33 sets the diagnosis object sensor. For example, the abnormality diagnosis unit 33 sets each rotation detection sensor 3a, 3b, 3c as the diagnosis object sensor in order at every calculation period.

In the step S02, the abnormality diagnosis unit 33 determines whether or not all the sensor output values of N pieces of rotation detection sensors are within the normal range. The abnormality diagnosis unit 33 determines whether or not the sensor output value is within the normal range about each of N pieces of rotation detection sensors; and determines that whether or not all of N pieces are determined to be within the normal range. Then, when it was determined that all are within the normal range, it advances to the step S03, and when it was not determined that all are within the normal range, it advances to the step S11. In the step S11, the abnormality diagnosis unit 33 determines that abnormality occurred in the rotation detection sensor 3 (the rotation detection sensor which is not within the normal range), and ends processing.

The normal range is set so as to include a variation range of the sensor output value at the normal time. For example, the normal range is set to a range wider than the variation range at the normal time by about several 10%.

According to this configuration, the abnormality determination of the diagnosis object sensor can be prevented from being performed using the abnormal rotation detection sensor whose sensor output value is not within the normal range, and the accuracy of abnormality determination can be improved. And, it can be determined that abnormality occurred in the rotation detection sensor whose sensor output value is not within the normal range.

In the step S03, as mentioned above, the abnormality diagnosis unit 33 totals the sensor output values of N−1 pieces of non-diagnosis object sensors; and calculates a value obtained by inverting positive/negative of the total value, as an estimation value SACest of sensor output value of the diagnosis object sensor. Then, the abnormality diagnosis unit 33 calculates an estimation difference ΔSACest which is a difference between a sensor output value SAC of the diagnosis object sensor, and the estimation value SACest of sensor output value of the diagnosis object sensor.

Then, in the step S04, as mentioned above, the abnormality diagnosis unit 33 determines whether or not the estimation difference ΔSACest is out of the determination range for estimation difference. When it is not out of the determination range for estimation difference, it advances to the step S05, and when it is out of the determination range for estimation difference, it advances to the step S06. In the step S05, the abnormality diagnosis unit 33 determines that the diagnosis object sensor is normal, and ends processing.

In the step S06, as shown in the next equation, the abnormality diagnosis unit 33 determines whether or not a period difference ΔSACt which is a difference between the sensor output value SACold of the diagnosis object sensor before a difference period ΔTdt and the sensor output value SAC diagnosis object sensor of this time is within the determination range for fixing determination (from THfxL to THfxH) including 0. When it is within the determination range for fixing determination, it advances to the step S07, and when it is not within the determination range for fixing determination, it advances to the step S08.

[Equation 6]

$$\Delta SACt = SAC - SACold$$

$$THfxL \leq \Delta SACt \leq THfxH \quad (6)$$

In the present embodiment, the difference period ΔTdt is set to the detection period, and the sensor output value SACold of the diagnosis object sensor detected at the last time detection timing is used. The difference period ΔTdt may be set to an integral multiple (twice or more) of the detection period.

Then, in the step S07, since the estimation difference ΔSACest is out of the determination range for estimation difference and the period difference ΔSACt is within the determination range for fixing determination, the abnormality diagnosis unit 33 determines that a fixing abnormality that the output signal of the diagnosis object sensor fixes to a constant value occurred.

When the fixing abnormality occurred, the output signal becomes a constant value, and the period difference ΔSACt becomes close to 0. Accordingly, when the period difference ΔSACt becomes within the determination range for fixing determination including 0, it can be determined that the fixing abnormality occurred among types of abnormality.

On the other hand, in the step S08, the abnormality diagnosis unit 33 determines whether or not the estimation difference ΔSACest is out of a determination range for connection determination (from THcnL to THcnH) which is wider than the determination range for estimation difference. When it is out of the determination range for connection determination, it advances to the step S09, and when it is not out of the determination range for connection determination, it advances to the step S10. For example, the determination range for connection determination (from THcnL to THcnH) is set to a range of about several 10% of the sensor output range of the sensor output value of the rotation detection sensor at the normal time.

In the step S09, since the estimation difference ΔSACest is out of the determination range for estimation difference, and the estimation difference ΔSACest is out of the determination range for connection determination, the abnormality diagnosis unit 33 determines that a connection failure of a signal wire which transmits the output signal of the diagnosis object sensor occurred.

When the connection failure of the signal wire occurred, the output signal varies intermittently or continuously due to vibration and the like, and the estimation difference ΔSACest varies largely intermittently or continuously. Accordingly, when the estimation difference ΔSACest becomes out of the determination range for connection determination which is wider than the determination range for estimation difference, it can be determined that the connection failure of the signal wire occurred among types of abnormality.

On the other hand, in the step S10, since the estimation difference ΔSACest is out of the determination range for estimation difference and some abnormality other than the connection failure and the fixing abnormality occurred, the abnormality diagnosis unit 33 simply determines that abnormality of the diagnosis object sensor occurred, and ends processing.

Example of Determination Behavior

Figure 6:
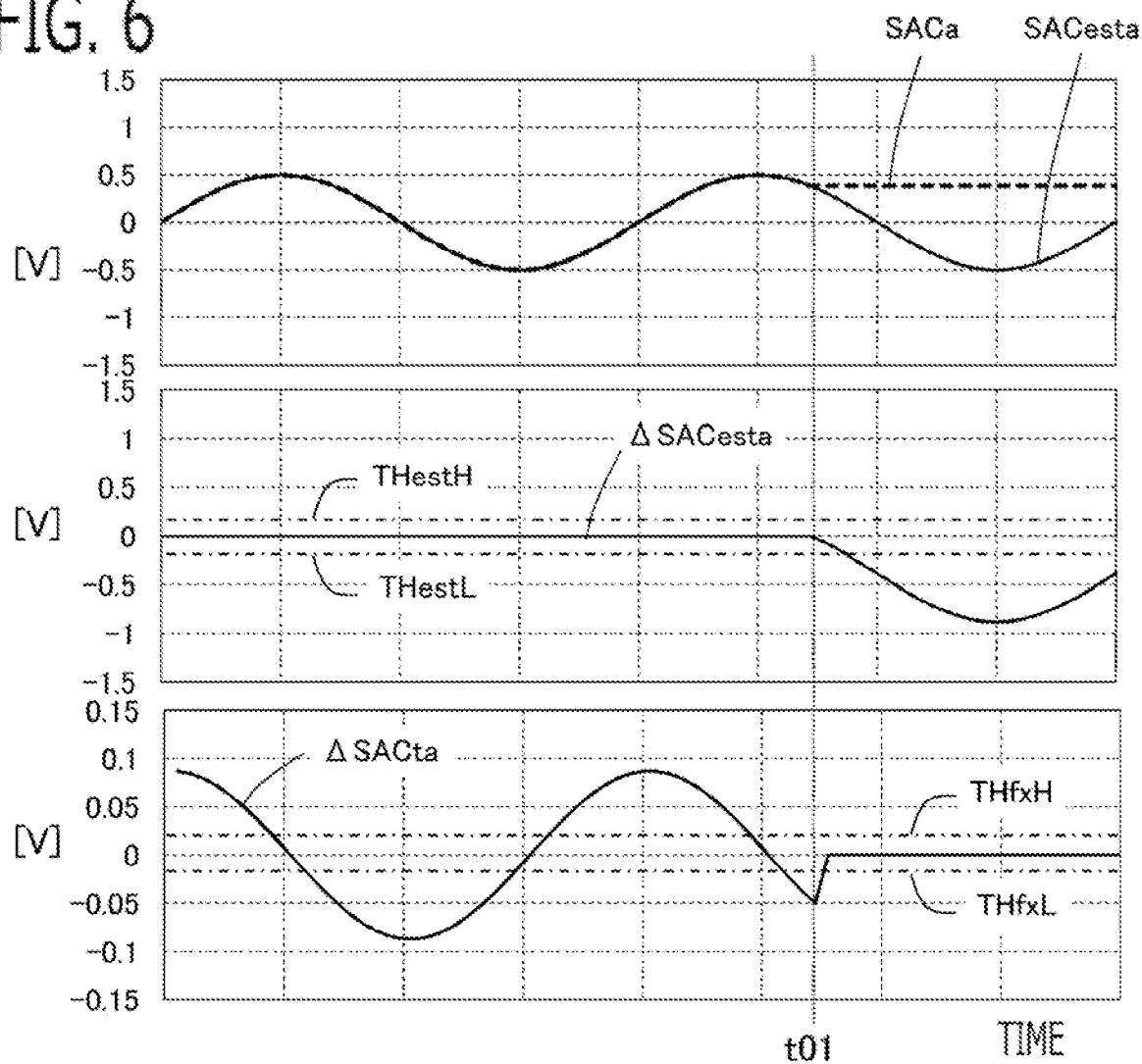
FIG. 6 is a time chart explaining the abnormality diagnosis behavior when the fixing abnormality occurred according to Embodiment 1.

A determination behavior when the fixing abnormality of the first rotation detection sensor 3a occurs is shown in FIG. 6. Until the time t01, the first rotation detection sensor 3a is normal. After the time t01, the fixing abnormality occurred and the sensor output value SACa of the first rotation detection sensor 3a fixes to a constant value.

Until the time t01, the sensor output value SACa of the first rotation detection sensor 3a coincides with the estimation value SACesta of the first rotation detection sensor 3a, and the estimation difference ΔSACesta is close to 0, and becomes within the determination range for estimation error (from THestL to THestH). Accordingly, it is determined that the first rotation detection sensor 3a is normal. However, after the time t01, the estimation difference ΔSACesta is varied from the vicinity of 0 due to a fixing, and becomes out of the determination range for estimation error (from THestL to THestH), and it is determined that abnormality occurred in the first rotation detection sensor 3a.

Until the time t01, the period difference ΔSACta which is a difference between the last time sensor output value SAColda and this time sensor output value SACa is varied periodically. After the time t01 when the fixing occurred, the period difference ΔSACta becomes 0 and becomes within the determination range for fixing determination (from THfxL to THfxH). Accordingly, it is determined with good accuracy that the fixing abnormality occurred among the types of abnormality.

Figure 7:
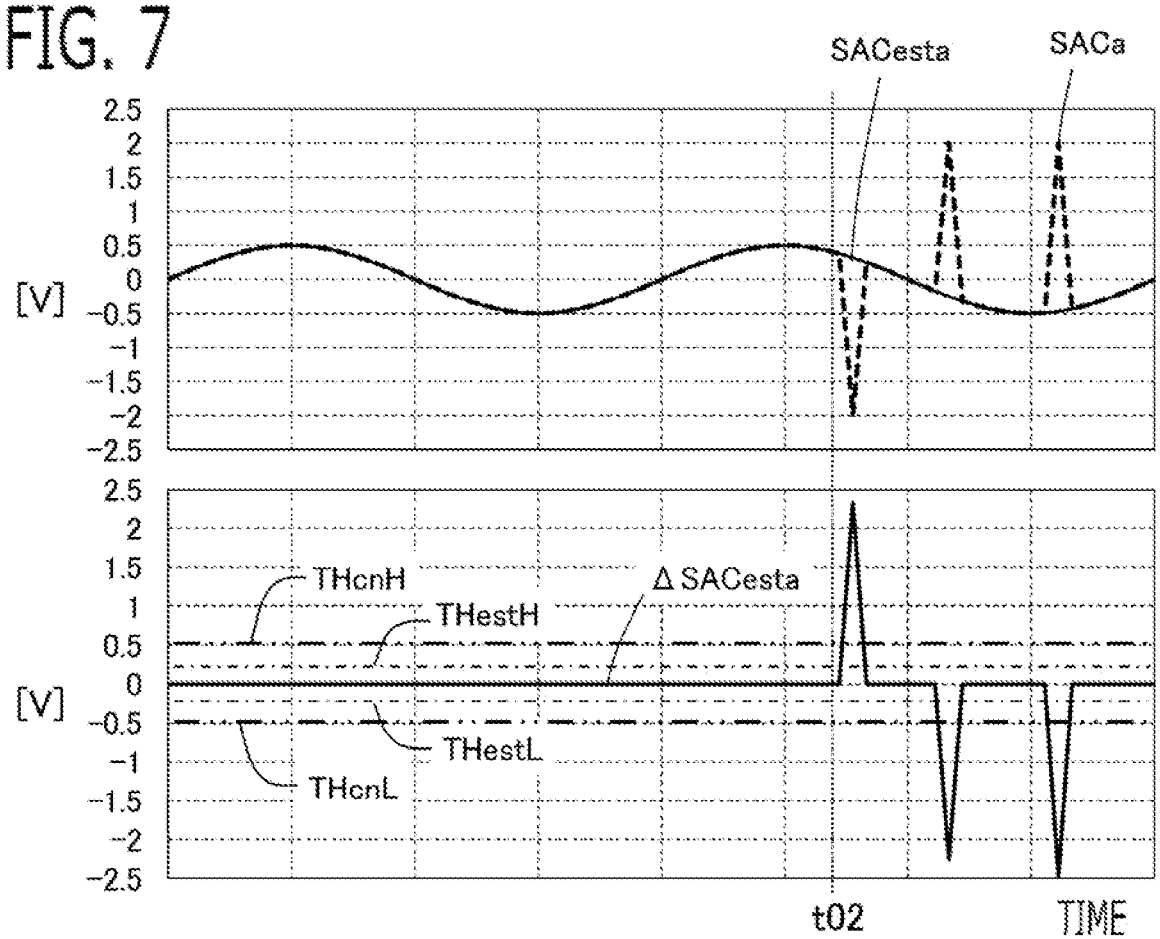
FIG. 7 is a time chart explaining the abnormality diagnosis behavior when the connection failure occurred according to Embodiment 1.

FIG. 7 shows a determination behavior when the connection failure of the first rotation detection sensor 3a occurs. Until the time t02, the first rotation detection sensor 3a is normal. After the time t02, a connection failure occurs, and the sensor output value SACa of the first rotation detection sensor 3a is varied intermittently.

Until the time t02, the sensor output value SACa of the first rotation detection sensor 3a coincides with the estimation value SACesta of the first rotation detection sensor 3a, and the estimation difference ΔSACesta is close to 0, and becomes within the determination range for estimation error (from THestL to THestH). Accordingly, it is determined that the first rotation detection sensor 3a is normal. However, after the time t02, the estimation difference ΔSACesta is intermittently varied from the vicinity of 0 due to a connection failure, and becomes out of the determination range for estimation error (from THestL to THestH), and it is determined that abnormality occurred in the first rotation detection sensor 3a.

Due to occurrence of the connection failure, the estimation difference ΔSACesta is largely varied from 0, and becomes out of the determination range for connection determination (from THcnL to THcnH) which is wider than a determination range for estimation error (from THestL to THestH). Accordingly, it is determined with good accuracy that the connection failure occurred among the types of abnormality.

<Angle Calculation Unit 32>

The angle calculation unit 32 calculates the rotational angle θ of the rotation member 9, based on the sensor output values of the three pieces of rotation detection sensors 3. In the present embodiment, when it is not determined that abnormality occurred in the rotation detection sensor 3, the angle calculation unit 32 calculates the rotational angle θ in the electrical angle, based on the sensor output values SACa, SACb, SACc of the three pieces of rotation detection sensors 3 using the next equation.

[Equation 7]

$$\begin{bmatrix} \alpha \\ \beta \end{bmatrix} = \begin{bmatrix} \cos(0) & \cos\left(\frac{2}{3}\pi\right) & \cos\left(\frac{4}{3}\pi\right) \\ \sin(0) & \sin\left(\frac{2}{3}\pi\right) & \sin\left(\frac{4}{3}\pi\right) \end{bmatrix} \begin{bmatrix} SACa \\ SACb \\ SACc \end{bmatrix} \quad (7)$$

$$\theta = \tan^{-1}\left(\frac{\alpha}{\beta}\right)$$

On the other hand, when it is determined that abnormality occurred in the rotation detection sensor 3, the angle calculation unit 32 calculates the rotational angle θ, based on the sensor output values SAC of the rotation detection sensors which are not determined that abnormality occurred. In the present embodiment, as shown in the equation (4) and the equation (5), the angle calculation unit 32 totals the sensor output values of N−1 pieces of normal rotation detection sensors other than the rotation detection sensor that abnormality occurred, calculates a value obtained by inverting positive/negative of the total value, as the estimation value SACest of the sensor output value of the rotation detection sensor that abnormality occurred. Then, in the equation (7), the angle calculation unit 32 use the estimation value SACest of the sensor output value of the rotation detection sensor that abnormality occurred, instead of the sensor output value SAC of the rotation detection sensor that abnormality occurred; and calculates the rotational angle θ in the electrical angle, based on the sensor output values SAC of N−1 pieces of normal rotation detection sensors, and the estimation value SACest of the sensor output value of the rotation detection sensor that abnormality occurred.

2. Embodiment 2

The rotational angle detection apparatus 1 according to Embodiment 2 will be explained with reference to drawings. The explanation for constituent parts the same as those in Embodiment 1 will be omitted. The basic configuration of the rotational angle detection apparatus 1 according to the present embodiment is the same as that of Embodiment 1. However, in the present embodiment, the processing of the abnormality diagnosis unit 33 is different from Embodiment 1.

In the present embodiment, the abnormality diagnosis unit 33 sets the diagnosis object sensor which is the one rotation detection sensor for performing abnormality diagnosis; calculates a maximum minimum difference ΔSACmnmx which is a difference between the maximum value SACmax and the minimum value SACmin of the sensor output value SAC of the diagnosis object sensor in one cycle of electric angle ΔTcyl which is one period of the sine wave-shaped sensor output value, as shown in the next equation; and determines that a fixing abnormality that the output signal of the diagnosis object sensor fixes to a constant value occurred, when a condition where a magnitude of the maximum minimum difference ΔSACmnmx is less than or equal to a determination value for maximum minimum difference THmnmx continues during a fixing determination period ΔTfx.

[Equation 8]

$$\Delta SACmnmx = SAC\max - SAC\min$$

$$\Delta SACmnmx \leq THmnmx \quad (8)$$

Since the maximum minimum difference ΔSACmnmx in one cycle of electric angle ΔTcyl approaches 0 when the fixing abnormality occurred, occurrence of fixing abnormality can be determined with good accuracy according to the above configuration.

<Flowchart>

Figure 8:
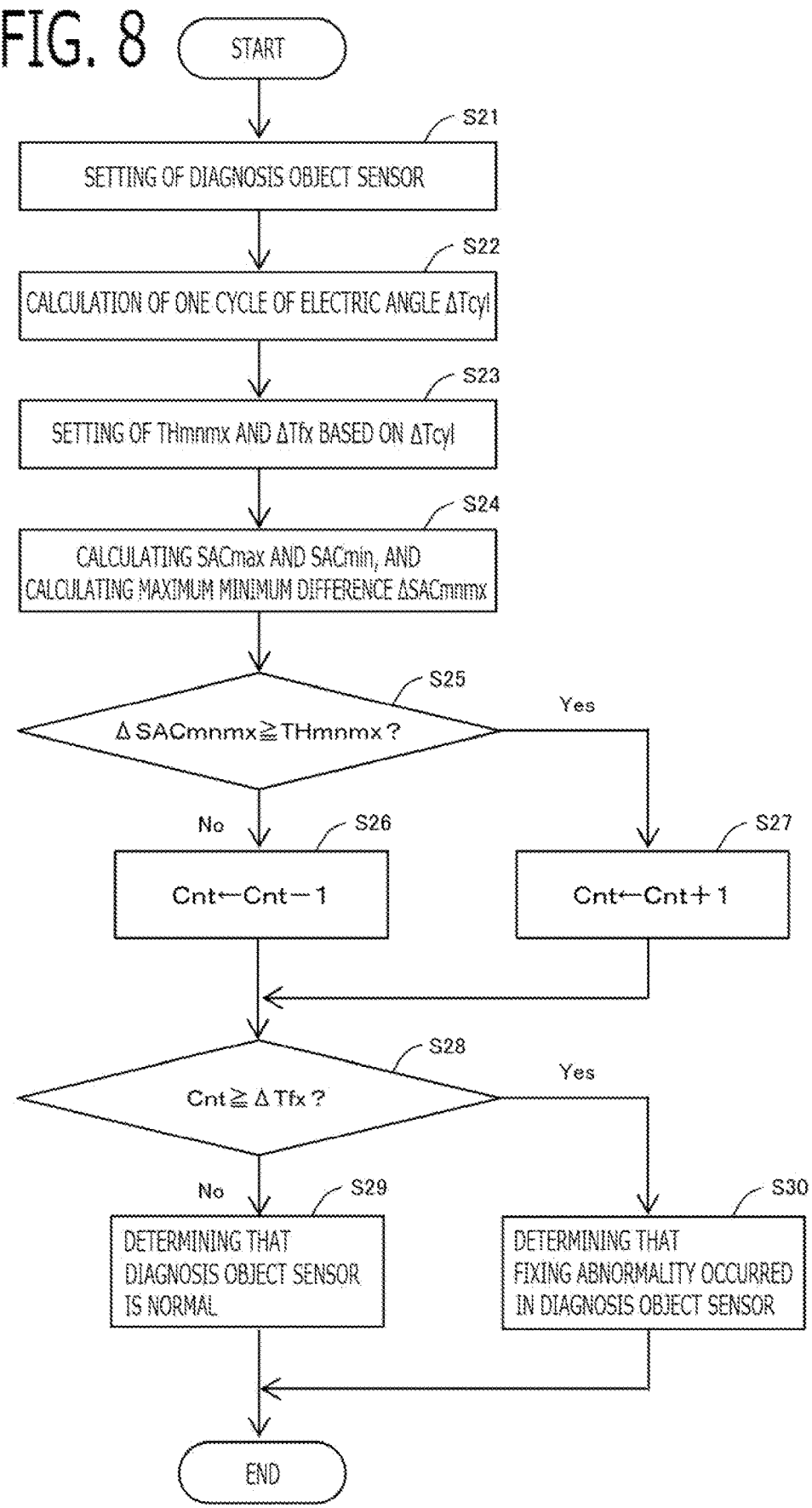
FIG. 8 is a flowchart explaining processing of the abnormality diagnosis unit according to Embodiment 2.

Processing of the abnormality diagnosis unit 33 according to the present embodiment is configured like the flowchart shown in FIG. 8. Processing of the flowchart of FIG. 8 is executed at every calculation period.

In the step S21, the abnormality diagnosis unit 33 sets the diagnosis object sensor. For example, the abnormality diagnosis unit 33 sets each rotation detection sensor 3a, 3b, 3c as the diagnosis object sensor in order at every calculation period.

In the step S22, the abnormality diagnosis unit 33 calculates one cycle of electric angle $\Delta Tcyl$, based on a time point when the sensor output value SAC of non-diagnosis object sensor other than the diagnosis object sensor crosses a center value (in this example, 0).

As shown in FIG. 9, the abnormality diagnosis unit 33 measures the time point when the sensor output value SAC of non-diagnosis object sensor crosses 0 by a timer; and calculates a time difference between a crossing time point two times before and a time point this time, as one cycle of electric angle $\Delta Tcyl$. At this time, the crossing time point detected at the past calculation period is used. An averaging processing may be performed to the calculated one cycle of electric angle $\Delta Tcyl$.

According to this configuration, one cycle of electric angle $\Delta Tcyl$ can be calculated with good accuracy, based on the sensor output value SAC of non-diagnosis object sensor.

In the step S23, the abnormality diagnosis unit 33 sets the determination value for maximum minimum difference THmnmx and the fixing determination period $\Delta Tfx$, based on the one cycle of electric angle $\Delta Tcyl$. The abnormality diagnosis unit 33 decreases the determination value for maximum minimum difference THmnmx and increases the fixing determination period $\Delta Tfx$, as the one cycle of electric angle $\Delta Tcyl$ becomes long.

Since a period which is required for calculation of the maximum minimum difference $\Delta SACmnmx$ changes in proportion to the one cycle of electric angle $\Delta Tcyl$, the determination value for maximum minimum difference THmnmx and the fixing determination period $\Delta Tfx$ can be set appropriately according to the one cycle of electric angle $\Delta Tcyl$.

In the step S24, the abnormality diagnosis unit 33 calculates the maximum value SACmax and the minimum value SACmin of the sensor output value SAC of the diagnosis object sensor in the one cycle of electric angle $\Delta Tcyl$. For example, the abnormality diagnosis unit 33 determines the maximum value SACmax and the minimum value SACmin among the sensor output values SAC of the diagnosis object sensor detected during the past one cycle of electric angle $\Delta Tcyl$. Then, the abnormality diagnosis unit 33 calculates the maximum minimum difference $\Delta SACmnmx$ by subtracting the minimum value SACmin from the maximum value SACmax.

In the step S25, the abnormality diagnosis unit 33 determines whether or not the maximum minimum difference $\Delta SACmnmx$ is greater than or equal to the determination value for maximum minimum difference THmnmx. When it is greater than or equal to the determination value for maximum minimum difference THmnmx, it advances to the step S27, and when it is not greater than or equal to the determination value for maximum minimum difference THmnmx, it advances to the step S26.

In the step S26, the abnormality diagnosis unit 33 decreases an abnormality determination counter Cnt by one. The abnormality determination counter Cnt is lower-limited by 0, and its initial value is 0. On the other hand, in the step S27, the abnormality diagnosis unit 33 increases the abnormality determination counter Cnt by one.

In the step S28, the abnormality diagnosis unit 33 determines whether or not the abnormality determination counter Cnt is greater than or equal to the fixing determination period $\Delta Tfx$. When it is greater than or equal to the fixing determination period $\Delta Tfx$, it advances to the step S30, and when it is not greater than or equal to the fixing determination period $\Delta Tfx$, it advances to the step S29.

In the step S29, the abnormality diagnosis unit 33 determines that the diagnosis object sensor is normal (or the fixing abnormality does not occur in the diagnosis object sensor). On the other hand, in the step S30, the abnormality diagnosis unit 33 determines that the fixing abnormality occurred in the diagnosis object sensor.

Example of Determination Behavior

A determination behavior when the fixing abnormality of the first rotation detection sensor 3a occurs is shown in FIG. 10. Until the time t11, the first rotation detection sensor 3a is normal. After the time t11, the fixing abnormality occurred and the sensor output value SACa of the first rotation detection sensor 3a fixes to a constant value.

In the example of FIG. 10, the maximum minimum difference $\Delta SACmnmx$ is calculated at every one cycle of electric angle $\Delta Tcyl$. Since fixing does not occur until the time t11, the maximum minimum difference $\Delta SACmnmx$ exceeds the determination value for maximum minimum difference THmnmx. However, after the time t11, by occurrence of fixing abnormality, the maximum minimum difference $\Delta SACmnmx$ decreases to 0, and becomes less than the determination value for maximum minimum difference THmnmx. Although not shown in the figure, when a condition where the maximum minimum difference $\Delta SACmnmx$ is less than the determination value for maximum minimum difference THmnmx continues during the fixing determination period $\Delta Tfx$, it is determined that the fixing abnormality occurred in the first rotation detection sensor 3a.

3. Embodiment 3

The rotational angle detection apparatus 1 according to Embodiment 3 will be explained with reference to drawings. The explanation for constituent parts the same as those in Embodiment 1 will be omitted. The basic configuration of the rotational angle detection apparatus 1 according to the present embodiment is the same as that of Embodiment 1. However, in the present embodiment, the processing of the abnormality diagnosis unit 33 is different from Embodiment 1.

In the present embodiment, the abnormality diagnosis unit 33 sets the diagnosis object sensor which is the one rotation detection sensor for performing abnormality diagnosis; calculates a period difference $\Delta SACt$ which is a difference between the sensor output value SACold of the diagnosis object sensor before a difference period $\Delta Tdt$, and the sensor output value SAC of the diagnosis object sensor of this time, as shown in the next equation; and determines that the fixing abnormality that the output signal of the diagnosis object sensor fixes to a constant value occurred, when a condition where a period difference $\Delta SACt$ is within a determination range for fixing determination (from THfxL to THfxH) including 0 continues during a fixing determination period $\Delta Tfx$.

[Equation 9]

$$\Delta SACt = SAC - SACold$$

$$THfxL \leq \Delta SACt \leq THfxH \qquad (9)$$

In the present embodiment, the difference period $\Delta Tdt$ is set to the detection period, and the sensor output value SACold of the diagnosis object sensor detected at the last time detection timing is used. The difference period ΔTdt may be set to an integral multiple (twice or more) of the detection period.

Since the period difference ΔSACt approaches 0 when the fixing abnormality occurred, occurrence of fixing abnormality can be determined with good accuracy according to the above configuration. Even at the normal time, the period difference ΔSACt approaches 0 when the sensor output value SAC approaches the maximum value or the minimum value. Since continuation of the fixing determination period ΔTfx is determined, it is not erroneously determined that the fixing abnormality occurred.

<Flowchart>

Processing of the abnormality diagnosis unit 33 according to the present embodiment is configured like the flowchart shown in FIG. 11. Processing of the flowchart of FIG. 11 is executed at every calculation period.

In the step S41, the abnormality diagnosis unit 33 sets the diagnosis object sensor. For example, the abnormality diagnosis unit 33 sets each rotation detection sensor 3a, 3b, 3c as the diagnosis object sensor in order at every calculation period.

In the step S42, the abnormality diagnosis unit 33 calculates one cycle of electric angle ΔTcyl, based on a time point when the sensor output value SAC of non-diagnosis object sensor other than the diagnosis object sensor crosses a center value (in this example, 0). Since it is the processing similar to the step S22 of Embodiment 2, explanation is omitted.

In the step S43, the abnormality diagnosis unit 33 sets the determination range for fixing determination (from THfxL to THfxH), and the fixing determination period ΔTfx, based on the one cycle of electric angle ΔTcyl. The abnormality diagnosis unit 33 narrows the determination range for fixing determination (from THfxL to THfxH), and increases the fixing determination period ΔTfx, as the one cycle of electric angle ΔTcyl becomes long.

When the one cycle of electric angle ΔTcyl becomes long, the period difference ΔSACt at the normal time becomes small, and a period when the period difference ΔSACt at the normal time approaches 0 in the vicinity of the maximum value or the minimum value becomes long. Accordingly, the determination accuracy can be maintained by narrowing the determination range for fixing determination (from THfxL to THfxH) and increasing the fixing determination period ΔTfx, as the one cycle of electric angle ΔTcyl becomes long.

In the step S44, the abnormality diagnosis unit 33 calculates the period difference ΔSACt which is a difference between the sensor output value SACold of the diagnosis object sensor before the difference period ΔTdt, and the sensor output value SAC of the diagnosis object sensor of this time.

In the step S45, the abnormality diagnosis unit 33 determines whether or not the period difference ΔSACt is within the determination range for fixing determination (from THfxL to THfxH). When it is within the determination range for fixing determination, it advances to the step S47, and when it is not within the determination range for fixing determination, it advances to the step S46.

In the step S46, the abnormality diagnosis unit 33 decreases an abnormality determination counter Cnt by one. The abnormality determination counter Cnt is lower-limited by 0, and its initial value is 0. On the other hand, in the step S47, the abnormality diagnosis unit 33 increases the abnormality determination counter Cnt by one.

In the step S48, the abnormality diagnosis unit 33 determines whether or not the abnormality determination counter Cnt is greater than or equal to fixing determination period ΔTfx. When it is greater than or equal to the fixing determination period ΔTfx, it advances to the step S50, and when it is not greater than or equal to the fixing determination period ΔTfx, it advances to the step S49.

In the step S49, the abnormality diagnosis unit 33 determines that the diagnosis object sensor is normal (or the fixing abnormality does not occur in the diagnosis object sensor). On the other hand, in the step S50, the abnormality diagnosis unit 33 determines that the fixing abnormality occurred in the diagnosis object sensor.

Example of Determination Behavior

A determination behavior when the fixing abnormality of the first rotation detection sensor 3a occurs is shown in FIG. 12. Until the time t21, the first rotation detection sensor 3a is normal. After the time t21, the fixing abnormality occurred and the sensor output value SACa of the first rotation detection sensor 3a fixes to a constant value.

Since fixing does not occur until the time t21, the period difference ΔSACta varies at the one cycle of electric angle. Even at the normal time, when the sensor output value SACa approaches the maximum value or the minimum value, the period difference ΔSACta approaches 0 and becomes within the determination range for fixing determination (from THfxL to THfxH). However, since continuation of the fixing determination period ΔTfx is determined, it is not erroneously determined that the fixing abnormality occurred.

However, after the time t21, due to occurrence of the fixing abnormality, the period difference ΔSACta becomes 0 and becomes within the determination range for fixing determination (from THfxL to THfxH). Then, although not shown in the figure, when a condition where the period difference ΔSACta becomes within the determination range for fixing determination continues during the fixing determination period ΔTfx, it is determined that the fixing abnormality occurred in the first rotation detection sensor 3a.

4. Embodiment 4

The rotational angle detection apparatus 1 according to Embodiment 4 will be explained with reference to drawings. The explanation for constituent parts the same as those in Embodiment 1 will be omitted. The basic configuration of the rotational angle detection apparatus 1 according to the present embodiment is the same as that of Embodiment 1. However, in the present embodiment, the processing of the abnormality diagnosis unit 33 is different from Embodiment 1.

In the present embodiment, the abnormality diagnosis unit 33 sets the diagnosis object sensor which is the one rotation detection sensor for performing abnormality diagnosis; calculates a period difference ΔSACt which is a difference between the sensor output value SACold of the diagnosis object sensor before a difference period ΔTdt, and the sensor output value SAC of the diagnosis object sensor of this time, as shown in the next equation; and determines that a connection failure of a signal wire which transmits the output signal of the diagnosis object sensor occurred, when a number of times when the period difference ΔSACt became out of a determination range for connection failure (from THcnL to THcnH) including 0 in a connection failure determination period ΔTcn becomes a connection failure determination number Ncn or more.

[Equation 10]

$$\Delta SACt = SAC - SAC\text{old}$$

$$\Delta SACt < TH cnL, TH cnH < \Delta SACt \quad (10)$$

In the present embodiment, the difference period ΔTdt is set to the detection period, and the sensor output value SACold of the diagnosis object sensor detected at the last time detection timing is used. The difference period ΔTdt may be set to an integral multiple (twice or more) of the detection period.

When the connection failure of the signal wire occurred, the output signal varies, and before and after the connection failure occurred, the period difference ΔSACt varies largely from the normal sensor output range centering on 0. Accordingly, when a number of times when the period difference ΔSACt became out of the determination range for connection failure in the connection failure determination period ΔTcn becomes the connection failure determination number Ncn or more, it can be determined that the connection failure of the signal wire occurred.

<Flowchart>

Processing of the abnormality diagnosis unit 33 according to the present embodiment is configured like the flowchart shown in FIG. 13. Processing of the flowchart of FIG. 13 is executed at every calculation period.

In the step S61, the abnormality diagnosis unit 33 sets the diagnosis object sensor. For example, the abnormality diagnosis unit 33 sets each rotation detection sensor 3a, 3b, 3c as the diagnosis object sensor in order at every calculation period.

In the step S62, the abnormality diagnosis unit 33 calculates one cycle of electric angle ΔTcyl, based on a time point when the sensor output value SAC of non-diagnosis object sensor other than the diagnosis object sensor crosses a center value (in this example, 0). Since it is the processing similar to the step S22 of Embodiment 2, explanation is omitted.

In the step S63, the abnormality diagnosis unit 33 sets the determination range for connection failure (from THcnL to THcnH), and the connection failure determination period ΔTcn, based on one cycle of electric angle ΔTcyl. The abnormality diagnosis unit 33 narrows the determination range for connection failure (from THcnL to THcnH), and increases the connection failure determination period ΔTcn, as the one cycle of electric angle ΔTcyl becomes long.

When the one cycle of electric angle ΔTcyl becomes long, a sensor output range of the period difference ΔSACt at the normal time becomes narrow, and a variation period of the period difference ΔSACt at the normal time becomes long. Accordingly, as the one cycle of electric angle ΔTcyl becomes long, the determination range for connection failure (from THcnL to THcnH) is narrowed in accordance with narrowing of the sensor output range of the period difference ΔSACt at the normal time, and the connection failure determination period ΔTcn is increased in accordance with the increase in the variation period of the period difference ΔSACt at the normal time. Thereby, the determination accuracy can be maintained.

In the step S64, the abnormality diagnosis unit 33 calculates the period difference ΔSACt which is a difference between the sensor output value SACold of the diagnosis object sensor before the difference period ΔTdt, and the sensor output value SAC of the diagnosis object sensor of this time.

In the step S65, the abnormality diagnosis unit 33 determines whether or not the period difference ΔSACt is out of the determination range for connection failure (from THcnL to THcnH). When it is out of the determination range for connection failure, it advances to the step S67, and when it is not out of the determination range for connection failure, it advances to the step S66.

In the step S66, the abnormality diagnosis unit 33 sets a determination result Rlt of this time calculation period to 0 indicating that it is not out of the determination range. On the other hand, in the step S67, the abnormality diagnosis unit 33 sets the determination result Rlt of this time calculation period to 1 indicating that it is out of the determination range.

In the step S68, the abnormality diagnosis unit 33 counts the number of times when the determination result Rlt which was determined during the past connection failure determination period ΔTcn was set to 1; and determines whether or not the number of times of being set to 1 is greater than or equal to the connection failure determination number Ncn. When it is greater than or equal to the connection failure determination number Ncn, it advances to the step S70, and when it is not greater than or equal to the connection failure determination number Ncn, it advances to the step S69.

In the step S69, the abnormality diagnosis unit 33 determines that the diagnosis object sensor is normal (or the connection failure does not occur in the diagnosis object sensor). On the other hand, in the step S70, the abnormality diagnosis unit 33 determines that the connection failure occurred in the diagnosis object sensor.

Example of Determination Behavior

A determination behavior when the fixing abnormality of the first rotation detection sensor 3a occurs is shown in FIG. 14. Until the time t31, the first rotation detection sensor 3a is normal. After the time t31, a connection failure occurs, and the sensor output value SACa of the first rotation detection sensor 3a is varied intermittently.

Since the connection failure does not occur until the time t31, the period difference ΔSACta varies within the determination range for connection failure (from THcnL to THcnH) at the one cycle of electric angle. However, the connection failure occurs intermittently after the time t31. Before and after the connection failure occurred, the period difference ΔSACta varies largely from the normal sensor output range centering on 0, and becomes out of the determination range for connection failure (from THcnL to THcnH).

When a number of times when the period difference ΔSACta became out of the determination range for connection failure (from THcnL to THcnH) in the connection failure determination period ΔTcn becomes the connection failure determination number Ncn or more, it is determined that the connection failure occurred in the first rotation detection sensor 3a.

Example of Conversion

In each of the above-mentioned embodiments, the magnetic sensor is used for the rotation detection sensor 3. However, as long as these are N pieces of rotation detection sensors (N is an integer greater than or equal to 3) that each sensor output value changes in a sine wave shape according to a rotational angle of a rotation member, and a total value of all the sensor output values becomes 0, any kind of sensor may be used. N may not be 3, but N may be greater than or equal to 4.

In each of the above-mentioned embodiments, the one cycle of electric angle ΔTcyl is calculated, based on a time point when the sensor output value SAC of non-diagnosis object sensor crosses a center value (0). However, the one cycle of electric angle ΔTcyl may be set, based on a zero crossing time point of a current detection value of motor winding, a zero crossing time point of an induced voltage of motor winding, a rotational speed information, or the like which are detected by a motor controller.

The controller 30 may be integrally configured with a controller for a rotation apparatus, such as a motor which rotates integrally with the rotation member 9.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A rotational angle detection apparatus comprising: N pieces of rotation detection sensors, wherein N is an integer greater than or equal to 3, that each sensor output value changes in a sine wave shape according to a rotational angle of a rotation member, and a total value of all the sensor output values becomes 0; and an abnormality diagnosis calculator that sets a diagnosis object sensor which is one rotation detection sensor of the N pieces of rotation detection sensors for performing abnormality diagnosis; totals sensor output values of N−1 pieces of the rotation detection sensors other than the diagnosis object sensor; calculates a value obtained by inverting positive/negative of a total value, as an estimation value of sensor output value of the diagnosis object sensor; calculates an estimation difference which is a difference between a sensor output value of the diagnosis object sensor, and the estimation value of sensor output value of the diagnosis object sensor; and determines that abnormality occurred in the diagnosis object sensor, when the estimation difference is out of a determination range for estimation difference.

2. The rotational angle detection apparatus according to claim 1,
wherein, when the estimation difference is out of the determination range for estimation difference, and a period difference which is a difference between the sensor output value of the diagnosis object sensor before a difference period and the sensor output value of the diagnosis object sensor of this time is within a determination range for fixing determination including 0, the abnormality diagnosis calculator determines that a fixing abnormality that the output signal of the diagnosis object sensor fixes to a constant value occurred.

3. The rotational angle detection apparatus according to claim 1,
wherein, when the estimation difference is out of the determination range for estimation difference, and the estimation difference is out of a determination range for connection determination which is wider than the determination range for estimation difference, the abnormality diagnosis calculator determines that a connection failure of a signal wire which transmits an output signal of the diagnosis object sensor occurred.

4. The rotational angle detection apparatus according to claim 1,
wherein, when all the sensor output values of N pieces of the rotation detection sensors are within a normal range, the abnormality diagnosis calculator performs an abnormality determination of the diagnosis object sensor which uses the estimation value of sensor output value of the diagnosis object sensor, and
when either one of the sensor output values of N pieces of the rotation detection sensors is not within the normal range, the abnormality diagnosis calculator does not perform the abnormality determination of the diagnosis object sensor which uses the estimation value of the sensor output value of the diagnosis object sensor.

5. The rotational angle detection apparatus according to claim 1, further comprising
an angle calculator that calculates the rotational angle of the rotation member, based on the sensor output values of N pieces of the rotation detection sensors,
wherein, when determining that abnormality occurred in the diagnosis object sensor, the angle calculator calculates the rotational angle, based on the sensor output values of the rotation detection sensors which are not determined that abnormality occurred.

6. A rotational angle detection apparatus comprising: N pieces of rotation detection sensors, wherein N is an integer greater than or equal to 3, that each sensor output value changes in a sine wave shape according to a rotational angle of a rotation member, and a total value of all the sensor output values becomes 0; and an abnormality diagnosis calculator that sets a diagnosis object sensor which is the one rotation detection sensor of the N pieces of rotation detection sensors for performing abnormality diagnosis; calculates a maximum minimum difference which is a difference between a maximum value and a minimum value of the sensor output value of the diagnosis object sensor in one cycle of electric angle which is one cycle of the sine wave-shaped sensor output value; and determines that a fixing abnormality that the output signal of the diagnosis object sensor fixes to a constant value occurred, when a condition where a magnitude of the maximum minimum difference is less than or equal to a determination value for maximum minimum difference continues during a fixing determination period.

7. The rotational angle detection apparatus according to claim 6,
wherein the abnormality diagnosis calculator calculates the one cycle of electric angle, based on a time point when the sensor output value of the rotation detection sensor other than the diagnosis object sensor crosses a center value; and decreases the determination value for maximum minimum difference and increases the fixing determination period, as the one cycle of electric angle becomes long.

8. The rotational angle detection apparatus according to claim 6, further comprising
an angle calculator that calculates the rotational angle of the rotation member, based on the sensor output values of N pieces of the rotation detection sensors,
wherein, when determining that abnormality occurred in the diagnosis object sensor, the angle calculator calculates the rotational angle, based on the sensor output values of the rotation detection sensors which are not determined that abnormality occurred.

9. A rotational angle detection apparatus comprising: N pieces of rotation detection sensors, wherein N is an integer greater than or equal to 3, that each sensor output value changes in a sine wave shape according to a rotational angle of a rotation member, and a total value of all the sensor output values becomes 0; and an abnormality diagnosis calculator that sets a diagnosis object sensor which is the one rotation detection sensor of the N pieces of rotation detection sensors for performing abnormality diagnosis; calculates a period difference which is a difference between the sensor output value of the diagnosis object sensor before a difference period and the sensor output value of the diagnosis object sensor of this time; and determines that a fixing abnormality that the output signal of the diagnosis object sensor fixes to a constant value occurred, when a condition where the period difference is within a determination range for fixing determination including 0 continues during a fixing determination period.

10. The rotational angle detection apparatus according to claim 9,
wherein the abnormality diagnosis calculator calculates one cycle of electric angle which is one cycle of the sine wave-shaped sensor output value, based on a time point when the sensor output value of the rotation detection sensor other than the diagnosis object sensor crosses a center value; and narrows the determination range for fixing determination and increases the fixing determination period, as the one cycle of electric angle becomes long.

11. The rotational angle detection apparatus according to claim 9, further comprising
an angle calculator that calculates the rotational angle of the rotation member, based on the sensor output values of N pieces of the rotation detection sensors,
wherein, when determining that abnormality occurred in the diagnosis object sensor, the angle calculator calculates the rotational angle, based on the sensor output values of the rotation detection sensors which are not determined that abnormality occurred.

12. A rotational angle detection apparatus comprising: N pieces of rotation detection sensors, wherein N is an integer greater than or equal to 3, that each sensor output value changes in a sine wave shape according to a rotational angle of a rotation member, and a total value of all the sensor output values becomes 0; and an abnormality diagnosis calculator that sets a diagnosis object sensor which is one rotation detection sensor of the N pieces of rotation detection sensors for performing abnormality diagnosis; calculates a period difference which is a difference between the sensor output value of the diagnosis object sensor before a difference period and the sensor output value of the diagnosis object sensor of this time; and determines that a connection failure of a signal wire which transmits an output signal of the diagnosis object sensor occurred, when a number of times when the period difference became out of a determination range for connection failure including 0 during a connection failure determination period becomes greater than or equal to a connection failure determination number.

13. The rotational angle detection apparatus according to claim 12,
wherein the abnormality diagnosis calculator calculates one cycle of electric angle which is one cycle of the sine wave-shaped sensor output value, based on a time point when the sensor output value of the rotation detection sensor other than the diagnosis object sensor crosses a center value; and narrows the determination range for connection failure and increases the connection failure determination period, as the one cycle of electric angle becomes long.

14. The rotational angle detection apparatus according to claim 12, further comprising
an angle calculator that calculates the rotational angle of the rotation member, based on the sensor output values of N pieces of the rotation detection sensors,
wherein, when determining that abnormality occurred in the diagnosis object sensor, the angle calculator calculates the rotational angle, based on the sensor output values of the rotation detection sensors which are not determined that abnormality occurred.

* * * * *